Figure 1:
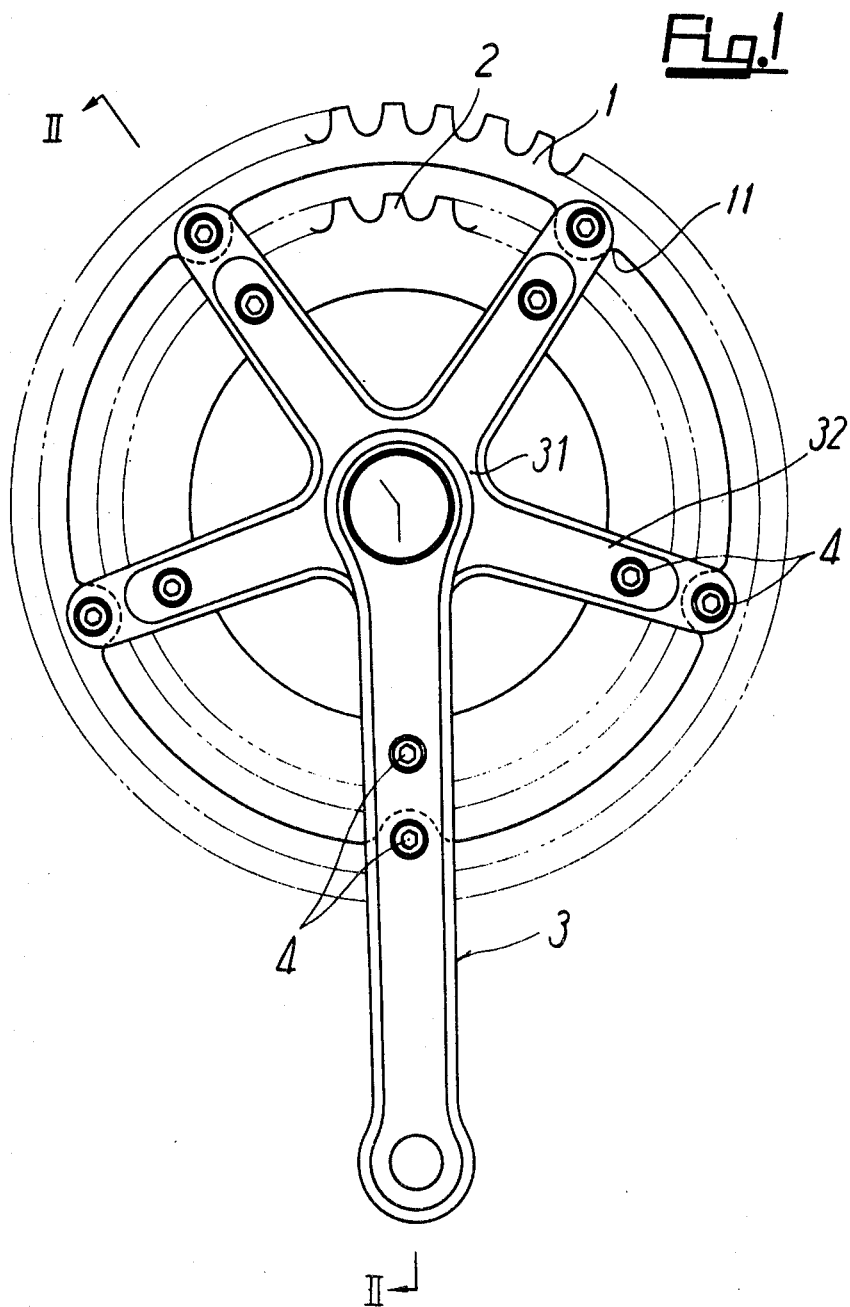

United States Patent [19]

Segawa

[11] 4,009,621
[45] Mar. 1, 1977

[54] ASSEMBLY OF CHAIN SPROCKETS AND CRANKS FOR BICYCLE

[75] Inventor: Takashi Segawa, Sakai, Japan

[73] Assignee: Shimano Industrial Company, Limited, Osaka, Japan

[22] Filed: Mar. 3, 1976

[21] Appl. No.: 663,364

[52] U.S. Cl. .......................... 74/243 DR; 74/594.2; 74/447

[51] Int. Cl.² .................. F16H 55/30; F16H 55/12

[58] Field of Search ....... 74/243 DR, 243 R, 594.2, 74/446, 447

[56] References Cited

UNITED STATES PATENTS

| 580,291 | 4/1897 | Osmond | 74/594.2 |
| 3,550,465 | 12/1976 | Maeda | 74/243 DR |
| 3,919,898 | 11/1975 | Sugino | 74/594.2 |

FOREIGN PATENTS OR APPLICATIONS

| 1,013,843 | 5/1952 | France | 74/243 DR |
| 1,029,474 | 6/1953 | France | 74/243 DR |
| 261,796 | 5/1949 | Switzerland | 74/243 DR |
| 641,308 | 9/1950 | United Kingdom | 74/243 DR |

*Primary Examiner*—Samuel Scott
*Assistant Examiner*—Allan R. Burke
*Attorney, Agent, or Firm*—Stevens, Davis, Miller & Mosher

[57] ABSTRACT

An assembly of chain sprockets and cranks for a bicycle, a plurality of which sprockets are formed of a punched metal plate and fixed at a predetermined interval to mounting arms. The arms are provided with a plurality of mounting seats formed inwardly stepwise from the utmost ends of the arms respectively so that each of the chain sprockets is fixed to each of the seats by means of a fixing means, whereby the assembly is inexpensive to manufacture by saving loss of materials, each sprocket can be changed independently, and the assembly is capable of preventing a driving chain from falling between the sprockets.

7 Claims, 5 Drawing Figures

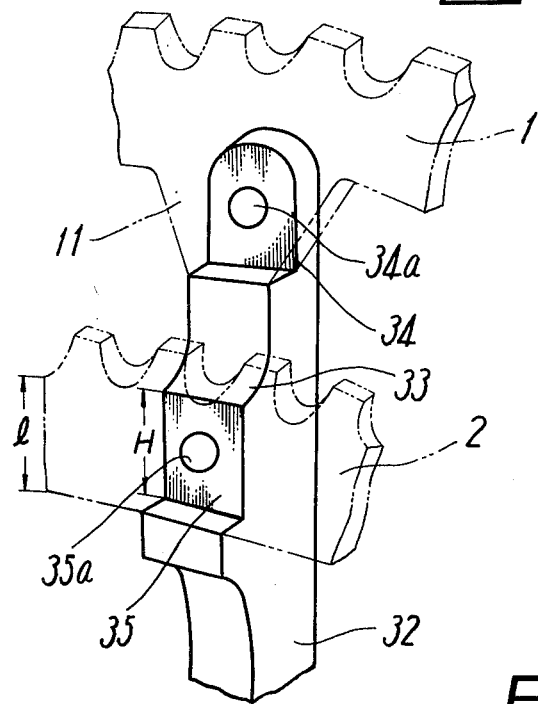
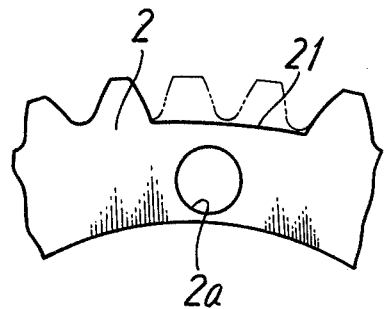
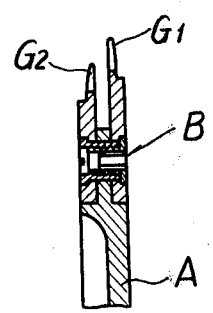

ASSEMBLY OF CHAIN SPROCKETS AND CRANKS FOR BICYCLE

This invention relates to an assembly of chain sprockets and cranks and more particularly to an assembly of two or more chain sprockets of different diameters and crank arms for a bicycle.

Generally, this kind of assembly of chain sprockets and cranks comprises one crank arm having a plurality of mounting arms radially extending and fixed thereto and chain sprockets fixed to the arms by means of bolts respectively, the crank arm having at its utmost end a pedal pivoted thereto and being fixed at its base to a crank shaft rotatably supported on a bicycle frame.

Conventionally, a multi-speed-change assembly of chain sprockets and cranks is composed of two or more sprockets of metallic plates separately formed desirably of different diameters respectively because the two sprockets $G_1$ and $G_2$ are, as shown in FIG. 5, mounted on the utmost end A of each of the arms by means of a connector B. Accordingly, the sprockets $G_1$ and $G_2$ should have the same inner diameter of the rims thereof, it being impracticable to be made of one plate particularly if the sprockets differ in their outer diameters.

Accordingly, the conventional assembly has problems such as expensive manufacturing costs from loss of material and the requirement of removing all sprockets when only one worn sprocket is replaced.

There is suggested another assembly of one of the sprockets integrated with the mounting arms and the other fixed to the arms, wherein the arms and one sprocket are formed integrally with each other from one metallic plate so that loss of materials may, as abovementioned, be lessened but the sprockets are still made separately. As a result, the assembly is still expensive and it is difficult to replace the sprockets and arms as a whole even to remove only one worn sprocket.

This invention has been designed to solve the aforesaid problems. A main object of the invention is to provide an assembly comprising a plurality of chain sprockets formed of one metallic plate and cranks, which is moderate in manufacturing cost by saving loss of materials. Another object of the invention is to provide an assembly comprising a plurality of chain sprockets and cranks, the sprockets being independently changeable. Still another object is to provide an assembly of a plurality of chain sprockets and cranks, capable of preventing a driving chain from falling between the sprockets to lock the crank arm when the chain is shifted from one sprocket to another.

Namely, the assembly of chain sprockets and cranks of the invention is characterized in that a plurality of chain sprockets are formed from one punched metal plate and fixed to mounting arms which are provided with a plurality of seats formed stepwise from the utmost end to the base of each of the arms so that the sprockets are independently fixed to the seats respectively. Thus, the aforesaid defects in the conventional assembly are completely eliminated.

Figure 2:
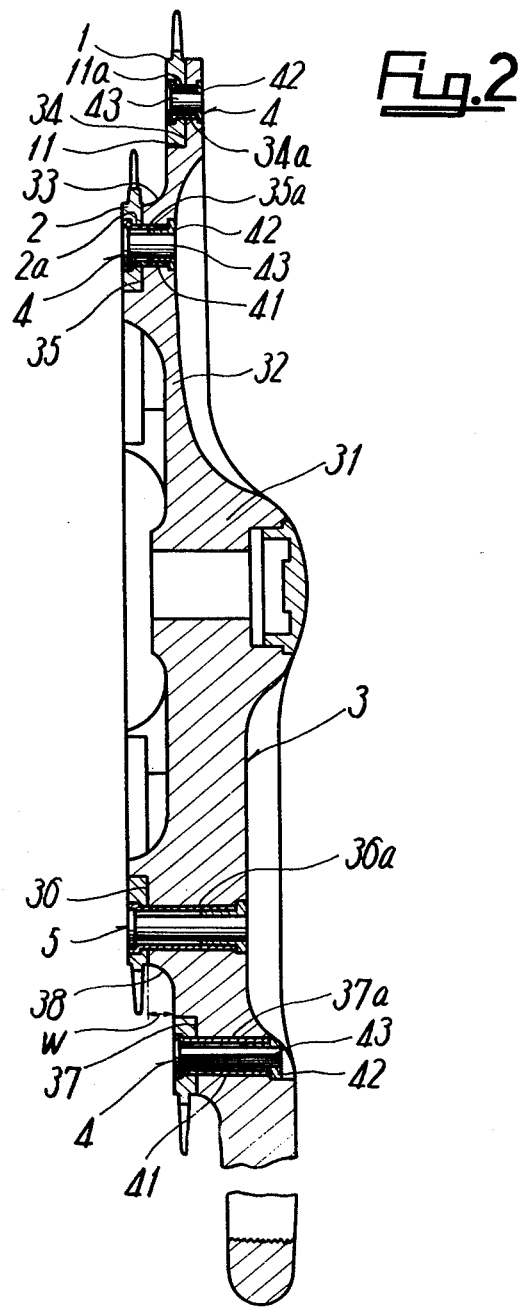

The aforesaid objects of the invention and others will be apparent from the following description in accordance with the accompanying drawings, in which FIG. 1 is a front view of the assembly of chain sprockets and cranks in accordance with the invention, FIG. 2 is a longitudinal section thereof taken on Line II—II in FIG. 1, omitting a part of the crank arm, FIG. 3 is a perspective view of one end portion of the mounting arm, showing the chain sprockets to be mounted thereto in dotted lines, FIG. 4 is a front view of a modified embodiment, showing a partially enlarged portion of a reduced diameter sprocket thereof, and FIG. 5 is a sectional view of only mounting portion of the chain sprocket to the arm of a conventional assembly of chain sprockets and cranks.

The assembly shown in FIGS. 1 and 2, comprises two chain sprockets, a crank arm and mounting arms fixed thereto and is the so-called double chain sprocket.

Referring to the drawings, the reference numeral 1 denotes an enlarged diameter chain sprocket located to the outside of the assembly, and 2 denotes a reduced diameter sprocket at the inside of the same, both sprockets being made from a punched metal plate. The enlarged diameter chain sprocket is provided at its inner periphery with a plurality of tongues 11 inwardly extending in regular intervals and having mounting bores 11a for mounting the sprockets therethrough, and the reduced diameter sprocket 2 has an outer diameter larger than the inner diameter of the enlarged diameter sprocket 1.

The outer diameter of the reduced diameter sprocket 2 is approximately equal to or slightly smaller than that of a phantom circle tracing the top of each of the tongues 11 at the enlarged diameter sprocket 1. Incidentally, the tongues 11 of the sprocket 1 are not always necessary because the mounting bores 11a may be perforated through the rim when it is enough wide between the inner periphery thereof and the bottom land of the teeth of the sprocket 1.

If it is desired to make the outer diameter of the reduced diameter sprocket 2 larger than that shown in FIG. 1, that is, when it is desired to increase the number of the teeth, some of the teeth at the small sprocket 2 are, as shown in FIG. 4, removed therefrom to form a cut-out 21 in lieu of each of the mounting tongues 11 as aforesaid.

Also, the reduced diameter sprocket 2 is provided with mounting bores 2a at regular intervals smaller than those of the enlarged diameter sprocket but radially in alignment with the mounting bores 11a at the sprocket 1 respectively.

The chain sprockets 1 and 2 are, as shown in FIG. 1, supported to the crank in an axially predetermined interval through the plurality of mounting arms. The arms 32 are mutually connected at the base thereof and extend radially outwardly to the utmost ends respectively and may be separately formed to be fixed to the crank arm 3 respectively, but mainly integrated with a boss 31 of the crank arm 3. In this instance, one of the mounting arms 32, usually five in the member, is preferred to be, as shown in FIG. 2, replaced by the crank arm 3.

In addition, each of the mounting arms 32 is, as shown in FIG. 3, provided, at the utmost end and a portion spaced towards the base thereof, with two mounting seats 34 and 35 through a stepped portion 33. Namely, the one seat 35 at the base side is located at the inner surface of the crank arm 3, i.e., the surface at the frame side when the arm is mounted to a bicycle, while, the other seat 34 is formed at the utmost end of the mounting arm 32 axially outwardly of the sprocket across the stepped portion 33 so as to be axially spaced by a distance w which is slightly larger than the driving chain width. Both the seats 34 and 35 are formed of vertical and horizontal walls (precisely, each of wall face is slightly curved), which vertical walls are perforated with mounting bores 34a and 35a corresponding to the aforesaid mounting bores 11a and 2a respectively. Furthermore, the vertical walls, particularly those of the mounting seats 35, are formed in a height H coincident with the rim thickness $l$ exclusive of the whole depth of the tooth of the sprocket 2 and the horizontal walls have a width equal to the width of the chain sprockets 1 and 2 respectively, and the sprockets 1 and 2 may be in contact at the inner peripheries of the rims thereof and the lateral sides with the horizontal walls and the vertical ones respectively so as to be supported to the seats 34 and 35 by means of a connecting means to be hereinafter described.

Each of the stepped portions 33 between the seats 34 and 35 has, as shown in FIG. 2, an inwardly curved surface. Thus, the combination, of the curved surface of the stepped portion 33 and the height of the vertical wall of each of the seats 35 corresponding to the rim thickness of the chain sprocket 2, can prevent the driving chain from falling between the chain sprockets 1 and 2 so that the chain may be shifted without hindrance from the large sprocket 1 to the small one 2.

When substituted for one of the arms 32, the crank arm 3 also has seats 36 and 37 formed as the same as the aforesaid seats 34 and 35, through a stepped portion 38, wherein the seats 36 and 37 have bores 36a and 37a of axial lengths larger than those of the aforesaid bores 34a and 35a respectively, resulting in an increased length of a connector to be hereinafter described.

Next, fixing means for fixing both the chain sprockets to the aforesaid mounting arms 32 respectively, will be described.

The fixing means employ well known connectors 4 which respectively comprise: a flanged cylindrical collar 41, larger in length than the rim width of each of chain sprockets 1 and 2; a flanged collar 42, similarly shaped, slightly smaller in its outer diameter than the inner diameter of the collar 41, and having inner screw threads; and a headed bolt 43 screwable therewith. The collar 41 is inserted from the sides of the sprockets 1 and 2 into each of the mounting bores of the sprockets 1 and 2 and the mounting arms and crank arm, the collar 42 is inserted from the side of the mounting arm 32 and the crank arm 3, and the bolt 43 is screwed with the collar 42 so that both the sprockets 1 and 2 may be secured to the arms 32 and crank arm 3 respectively.

As clearly understood from the abovementioned description, the assembly of chain sprockets and cranks in accordance with the invention can be provided with a plurality of chain sprockets formed of one punched metal plate, thereby being inexpensive to manufacture by saving loss of materials. Furthermore, each of the chain sprockets can be easily mounted to the arms by being fixed independently thereto and also when a worn sprocket is replaced by a new one there is no need for all the sprockets to be removed because of the removal of each sprocket to be changed.

In addition, the seats for mounting each of the sprockets thereon are located across the stepped portion of the inwardly curved surface and have vertical walls of a height corresponding to the rim thickness of each of the sprockets exclusive of the teeth thereof, whereby the driving chain is, when shifted from the enlarged diameter sprocket to the reduced one, exactly prevented from falling between both the sprockets so as not to hinder the rotation thereof.

While a preferred embodiment of the invention has been described using specific terms, such description is for illustrative purpose only, and it is to be understood that changes and variations may be made with departing from the spirit or scope of the following claims.

What is claimed is:

1. An assembly of chain sprockets and cranks for a bicycle, comprising:
   a plurality of chain sprockets of different diameters, said chain sprockets being annular ring-like plate members with teeth on the outer periphery thereof and having mounting bores spaced circumferentially about said ring-like plate members;
   a plurality of mounting arms for fixing said chain sprockets thereto; and fixing means for fixing said chain sprockets to said mounting arms respectively, said mounting arms having bases connected together, each of said mounting arms extending radially outwardly from its base and terminating in a tip, each of said mounting arms having a plurality of seats formed therein at different radii from its base to its tip, each of said seats having a mounting bore aligned with one of the mounting bores on the appropriate diameter sprocket, whereby said chain sprockets are supported by each of said seats and fixed thereto by said fixing means.

2. The assembly of chain sprockets and cranks as set forth in claim 1, wherein said seats comprise vertical and horizontal walls respectively, said horizontal walls being in contact with the inner periphery of the appropriate diameter chain sprocket, said vertical walls being in contact with a lateral side of the appropriate diameter chain sprocket and being substantially coincident with the radial extent of the appropriate diameter sprocket.

3. The assembly of chain sprockets and cranks for a bicycle as set forth in claim 2, wherein one of said adjacent seats, for mounting thereon a reduced diameter sprocket of both of said chain sprockets, is connected at a radially outer edge of said vertical wall of said seat with an axially outer edge of said horizontal wall of the other seat for mounting thereon an enlarged diameter sprocket through a stepped portion of an inwardly curved surface.

4. The assembly of chain sprockets and cranks for a bicycle as set forth in claim 1, wherein an enlarged diameter chain sprocket of the plurality of said chain sprockets comprises at the inner periphery of the rim thereof, mounting portions projecting radially inwardly of the rim of a reduced diameter sprocket of both of said chain sprockets, said portions mounting the chain sprockets therewith to said mounting arms respectively.

5. The assembly of chain sprockets and cranks for a bicycle as set forth in claim 4, wherein said portions are formed by partially cutting off teeth of said reduced diameter sprocket respectively.

6. The assembly of chain sprockets and cranks for a bicycle as set forth in claim 1, wherein one of said mounting arms is integral with a crank arm body.

7. The assembly of chain sprockets and cranks for a bicycle as set forth in claim 6, wherein one of said mounting arms is integrally connected with said crank arm body.

* * * * *